Nov. 12, 1963 G. W. LARSON ETAL 3,110,626
APPARATUS FOR COATING DISCRETE SOLID MATERIAL
Filed Aug. 17, 1961 5 Sheets-Sheet 1

FIG. 1

INVENTORS
GERALD W. LARSON
PAUL A. MALLAK
BY Frank A. Steldt
John W. Klooster
ATTORNEYS

United States Patent Office 3,110,626
Patented Nov. 12, 1963

3,110,626
APPARATUS FOR COATING DISCRETE
SOLID MATERIAL
Gerald W. Larson, St. Paul, and Paul A. Mallak, St. Croix Beach, Minn., assignors to Minnesota Mining and Manufacturing Company, St. Paul, Minn., a corporation of Delaware
Filed Aug. 17, 1961, Ser. No. 132,039
8 Claims. (Cl. 118—303)

This invention relates to an apparatus for applying coating systems to discrete solids.

The discrete solids can be any of a wide variety of fluidizable materials including, for examples, such things as pills, tablets and similar pharmaceutical products; solid chemicals; hygroscopic materials such as calcium sulfate, aluminum oxide, potassium hydroxide and other drying agents; water-bearing substances such as sodium sulfate decahydrate, hydrated silicas, and the like; agricultural products including various types of seeds and such chemicals as plant defoliants, insecticides, fumigants, fertilizers, and the like; oxidation-sensitive materials, such as essential oils, vitamin products, reactive metals like zinc, lithium, magnesium, aluminum, and the like; miscellaneous active chemicals such as phosphors; etc.

The coating systems can likewise be any of a wide variety of atomizable materials including, for examples, such systems as stable suspensions of pigments, dyes, and the like; organic solutions of polymers such as elastomers, resins, plastics, and the like, e.g., solutions as polyvinyl chloride, acrylics, polystyrene, polyvinyl esters, epoxies, etc.; and polymer latices including stable polymer emulsions in an aqueous vehicle (e.g., polyvinyl acetate latices, styrene-butadiene copolymer latices, polyvinylidene chloride latices, polyacrylic resin latices, and the like).

It is an object of this invention to provide an improved apparatus for coating discrete solids.

It is another object of this invention to provide an improved apparatus for coating discrete solids whereby the discrete solids being coated are positioned within a flowing gas stream.

It is a still further object of this invention to provide an improved apparatus for uniformly and accurately coating discrete solids suspended in a moving air stream by effecting contact between such solids and an atomized coating material within the interior region of a velocity concentration control element mounted in the base region of a funnel-shaped coating chamber.

It is an additional object of this invention to provide an improved apparatus for coating discrete solids in which an exceptionally large amount of such solids can be contacted with a minimal amount of coating material so as to effect maximum efficiency of coating within a designated interval of time.

It is a still further object of this invention to provide an improved means whereby discrete solids can be uniformly coated within a verticaly positioned funnel-shaped coating chamber having a venturi tube connected to its base.

It is a still further object of this invention to provide an improved apparatus for uniformly coating discrete solids within a vertically positioned funnel-shaped coating chamber having a venturi tube connected to its base whereby the coating material is atomized by means of an atomizer assembly mounted within a gas foil guidance element axially positioned generally within the throat region of the venturi.

It is an additional object of this invention to provide an improved apparatus for coating discrete particles utilizing a flowing gas stream which can be maintained at a pressure less than that of the exterior atmosphere surrounding the coating chamber, such gas stream at the same time having the capacity to suspend and support the particles within a coating chamber during the coating operation.

It is a still further object of this invention to provide an improved apparatus for uniformly coating discrete solids having non-uniform size characteristics within a funnel-shaped coating chamber whereby the lightest fraction of discrete solids being coated can be exhausted through the top of said funnel-shaped coating chamber and recycled so as to reenter the base of the coating chamber without appreciably affecting the coating applied to such lightest fraction as compared with heavier fractions of discrete solids.

It is an additional object of this invention to provide an improved apparatus for coating discrete solids utilizing in combination a vertically positioned coating chamber, a control element mounted in the base region of the coating chamber, a venturi tube connected to the base of the coating chamber, an axially positioned atomizer assembly within the throat region of the venturi, and means whereby a lighter fraction of discrete solids being coated can be independently recycled from the top of the coating chamber to the bottom of the chamber without producing any substantial difference in coatings upon such lighter fraction as compared with heavier fractions retained within the said coating chamber.

These and other objects of this invention will become apparent on reading the following specification in conjunction with the drawings in which.

More particularly, this invention is directed to an apparatus for coating discrete solids containing a vertically positioned coating chamber having a control element axially mounted within a funnel-shaped base region and having a venturi tube connected to such base, said venturi tube having an axially positioned and vertically translatable gas foil guidance element within it, said guidance element being adapted to guide upwards into the control element interior an air stream passing upwards through the said venturi tube, said gas foil guidance element having an atomizer assembly mounted within it so as to pass atomized coating material upwards into the coating chamber, said coating chamber being equipped with means to recycle discrete solids exhausted through the top of said funnel-shaped coating chamber to the region immediately below said gas foil guidance element.

Still more specifically, this invention is directed to an apparatus for coating discrete solids which employs a vertically positioned coating chamber whose lower region is funnel-shaped. This coating chamber in its base region is connected to a tube which is characterized by having a restriction in its upper portion. This restriction is, throughout this application, termed a venturi, but it will be appreciated that the design dimensions of such restriction are not necessarily those proportions associated with a true venturi. Here the term broadly has reference to a restriction formed by two tapered conical sections fitted into a straight pipe or duct, which causes a drop in pressure and an increase in velocity of a gas stream passing through it.

It has been found that when such a venturi is fitted to the base of a vertically positioned funnel-shaped coating chamber, a number of outstanding unexpected advantages results. For one thing, the venturi provides a means of supporting discrete particles to be coated within the coating chamber with a minimum pressure loss. Thus, for example, while a screen has heretofore been stretched across the base region of such a coating chamber, such a screen causes considerable pressure drop in the gas stream, thereby decreasing considerably the efficiency of operation. The use of this venturi, however, allows one to maintain the particles within the coating chamber with minimum pressure loss and eliminates any need for a screen. The venturi principle also avoids the existence of any dead regions (i.e., regions of imperfect gas or particle distirbution relative to the remainder of a given system).

Within the throat or most restricted region of the venturi is mounted a means for atomizing the particular coating system to be used. Placing the atomizer assembly or spray nozzle arrangement within the throat of the venturi avoids plugging of the nozzle assembly, a well known and heretofore difficult problem in this art. Here plugging is avoided because the discrete solids being coated are supported above the venturi mouth and hence the solids do not contact the atomizer assembly.

One convenient relationship between coating chamber and venturi is to make the inside diameter of the venturi throat equal to approximately one-half the inside diameter of the neck region of the funnel-shaped lower region of the coating chamber. The included angle of the entrance cone of the venturi can correspond to true venturi tube design dimenions. It is usually convenient for the exit cone of the venturi to have an included angle greater than that associated with true, conventional venturi tube design, but not so great as to permit repose of the particular solids being coated in any given situation.

In accordance with this invention, it has been found that the coating apparatus of this invention employs with the venturi a vertically positioned axially mounted cylindrical or conical section which is vertically translatably located in the base funnel-shaped region of the coating chamber above the venturi tube. Such an element acts as a means for creating a zone of velocity concentration control, thereby maximizing a desirable discontinuity in gas velocity profile within the base region of the coating chamber. This control element has a base whose diameter is equal to or greater than the diameter of its top. This control element has circular cross-sections in all planes perpendicular to its axis. The largest (inside) control element diameter is larger than the (inside) throat diameter of the venturi.

It is desirable to have a discontinuity in the velocity profile to produce an annular zone wherein the upward air velocity will be less than the terminal velocities of a range of particle sizes. Such discontinuity not only eliminates or minimizes undesirable "short circuiting" of particles returning to the coating zone from the disengaging zone but also minimizes the internal recycle time. A further advantage is that the control element provides a barrier between upgoing and downcoming circulating particles. This barrier both prevents collisions between particles and avoids "slugging" or "choking." As those skilled in the art will appreciate, slugging would normally occur in the neck region of the coating chamber.

Still another advantage of using the control element is that one may with suitable adjustments permit maintenance of an annular bed of discrete particles being coated in the region lying between the exterior walls of the control element and the interior walls of the coating chamber neck. This annular bed enables one to support and circulate a much larger quantity of particles with a given gas stream than without such a bed. This is because the weight of a large fraction of particles at any given instant is supported by the combined walls of neck, cone, exit cone of venturi. Also, one can coat more material with a given piece of apparatus than would otherwise be the case since down-time, and charging and discharging times are minimized.

Also in accordance with this invention it has been found that if a gas foil guidance element is placed around the atomizer assembly and the whole axially mounted in the throat region of the venturi, then gas flow up through the venturi region is streamlined still further, tending towards the ideal condition of a flat velocity profile for the gas stream in the venturi throat. The choice of whether or not to use a gas foil guidance element in any particular embodiment depends upon a number of variables such as rate of gas flow, type of particles being coated, nature of the coating system, etc., so that no definite criteria can be given to determine whether or not a gas foil should be used in any given system employing the apparatus and method of this invention. Generally, when the size range of the particle charge is such that an appreciable quantity of material will be externally recycled, one will use a gas foil.

This invention is also directed to a coating apparatus employing a venturi attached to its base region as described, wherein a portion of the particulate solids being coated are recycled from the top region of the coating chamber to its base region by means which operates independently of the particle circulation achieved by means of the gas flow within the coating chamber. Such recyclization necessarily involves the use of a particle separation means by which the particulate solids removed from the off-gas stream from the top of the coating chamber are first separated from the off-gas stream itself. After separation, the particles are returned back to the coating chamber usually either by being added to the entering gas stream just below the venturi region of the coating apparatus, or by being fed to a solid bed inside the coating chamber alongside the outside walls of the control element. Thus, the recycle system can be either self-contained within the coating chamber or exteriorly positioned outside of the coating chamber, as is hereinafter more particularly described. In a coating apparatus using exterior recyclization, a preferred embodiment has an exterior port at the top of the coating chamber whose cross-sectional area exceeds the cross-sectional area of the mouth of the venturi.

Figure 1:
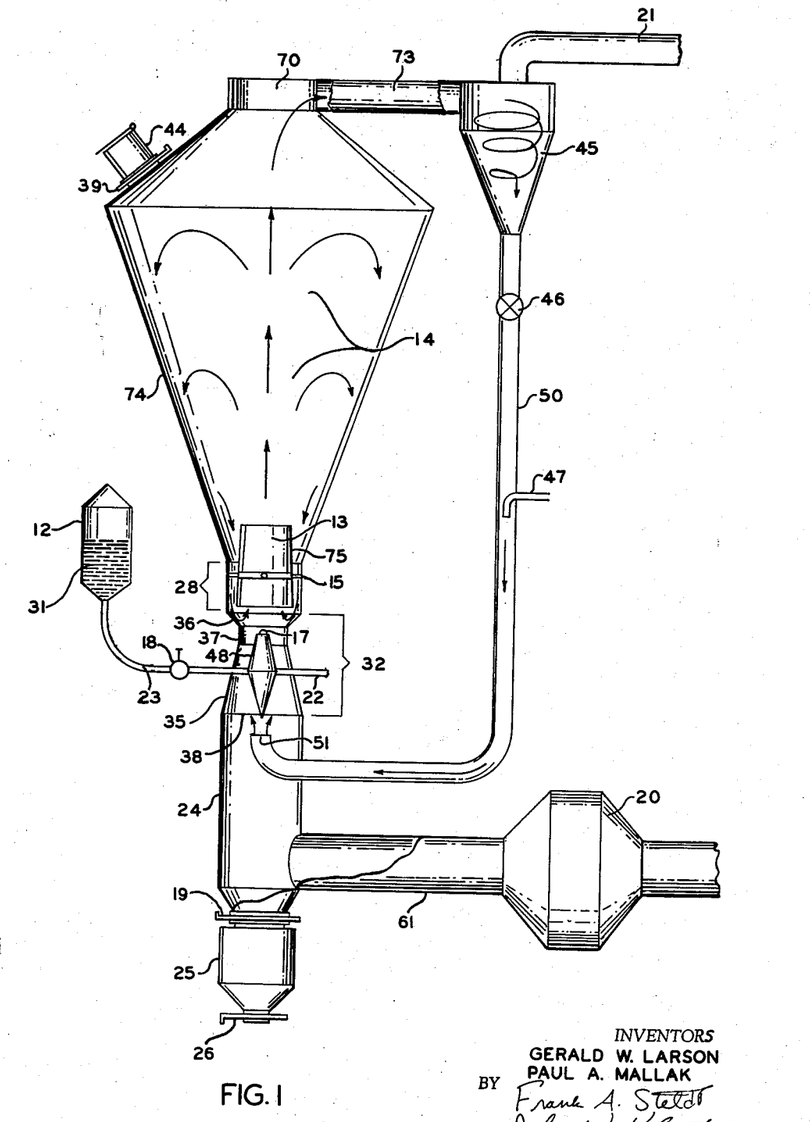
FIGURE 1 is a diagrammatic representation of an embodiment of apparatus constructed in accordance with this invention wherein recycling is externally accomplished.

Referring now to FIG. 1, it will be observed that coating chamber 74 is vertically positioned and is so constructed that its upper region is larger than its lower region as respects cross-sectional area. In fact, the coating chamber 74 can be considered as a conically-shaped or funnel-shaped cavity. In the neck or lower portion 28 of the coating chamber 74 is axially positioned a velocity concentration control cone 75 whose bottom or base is larger in diameter than its top. Immediately below this control cone 75 the base of the coating chamber 74 wall is connected with a duct 24 having a constricted venturi-type upper portion 32. Thus, conical section 35 can be considered as the entrance cone of a venturi, conical section 36 as the exit region of a venturi, and region 37 as the throat of a venturi. Axially positioned within and/or just below this throat region 37 is a gas foil guidance element 48 within whose mouth is mounted a nozzle assembly 17 for atomization of the coating material 31 into the control cone interior 13. As shown, coating material 31 is stored in a liquid supply reservoir 12 which is here depicted as a pressurized feed tank. To meter coating material 31 into atomizer nozzle assembly 17, a valve 18 can conveniently be used.

The apparatus as depicted herein is, generally speaking, constructed of components which exhibit a circular cross-section in a plane at right angles to the long axis thereof. Other cross-sectional configurations can of course be used.

The main gas supply for supporting and circulating particles within the coating chamber 74 is fed into duct 24 from duct 61. Usually the gas will be preheated by a gas heater 20, which can be of any conventional type such as an electrically heated or steam heated blast air type, for example. The gas stream passes up through duct 24 and into the venturi 32. Thereafter the gas stream enters the interior region of the velocity concentration control cone 75. The interior 13 of this cone constitutes the coating zone where discrete solid particles being coated are contacted with atomized coating materials. The gas stream passes upwards and eventually out through the top center 70 of the coating chamber 74.

The solid particles pass into the coating chamber 74 from any convenient source. For example, in the embodiment shown in FIG. 1 this source is a charging bin 44 which is fitted with a slide gate 39. Opening the slide gate 39 after the air flow in the coating chamber has been commenced dumps into the coating chamber a desired quantity of particulate solids to be coated. These solid particles are permitted to circulate in the coating chamber and become more or less uniformly dispersed throughout the interior of the chamber, the density at any given point, of course, being determined by the type of particles being coated, by the gas flow, and by related factors. The path of the particles is shown in FIG. 1 by the arrows drawn within coating chamber 74. Because of the difference in terminal velocities, lighter weight particles of a given size or smaller particles of a given specific gravity are carried further upwards within the disengaging zone 14 of coating chamber 74 than are the heavier or denser particles. In general, however, the air flow is preferably so regulated as to maintain most of the solids in circulation within coating chamber 74. The path of the solid particles, as can be seen from the arrows, is upwardly through the coating zone 13. The particles continue to move centrally and upwardly in the central axial region of the disengaging zone until they are no longer supported by the gas stream. Then they drop downwardly along the outer perimeter of the disengaging zone back into the neck region 28 of the coating chamber. Downwardly passing solids reaching the lower edge or base of the control cone 75 meet the air stream issuing from the venturi region 32 which causes the solids to pass up again through coating region 13 and thus the cycle is repeated.

As was mentioned, the lightest fraction (i.e., particles with the lowest terminal velocities) of discrete particles being coated passes furthest up within the disengaging zone 14. Indeed, a substantial portion of this lightest fraction tends to pass out through the top 70 of the coating chamber 74 and into duct 73, with the exhaust gas stream from the coating chamber. In order to improve the efficiency of the operation, it has now been found that if the particles which pass out through the top 70 of the coating chamber are recirculated to the coating chamber, the efficiency of the coating process is very much improved.

Recirculation involves as an essential element a particle recovery means which can be of any conventional design such as those involving centrifugal forces, electrostatic forces, bag filters, liquid scrubbers, and the like.

Thus, in FIG. 1 as a particle separation means employing centrifugal force there is used a cyclone 45 which effectively separates most if not all of the particles from the exhaust gas stream. The resulting particle-free exhaust gas stream is allowed to pass on out through duct 21 (exhaust means is conventional and is not shown). Usually the gas stream is air, but those skilled in the art will appreciate that for particular types of coating operations, other gas compositions can be employed.

Instead of a centrifugal separator there can be employed a separator using electrostatic forces such as the well known Cottrell precipitator by which is meant a device for the deposition of the fine particles on a series of wires which are at a different electric potential from their surroundings. Similarly, a bag filter arrangement or a liquid scrubber arrangement can be used.

In FIG. 1 particles collected by the cyclone 45 pass downwardly to a star valve 46. After passing through this star valve 46, the particles enter recirculation feed-through duct 50. In this embodiment the particles are allowed to fall freely for an interval through duct 50 until they reach an air jet lead-in which gives sufficient acceleration to the particles as to force them downwards and out through the exit port 51 located below gas foil guidance element 48. Thus, in FIG. 1 the particle return means comprises the star valve 46 combined with the gas injection means 47.

The need for a star valve 46 as an element of the particle return means can be eliminated by increasing the gas pressure in the gas jet lead-in 47. Such high pressure gas is sufficient to overcome the pressure drop normally associated with the interior of cyclone 45 and to provide sufficient velocity to the separated particles to force them through the recirculation feed-through duct 50.

When necessary to employ a particle return means, there can be used any known means which will so augment gravitational acceleration forces that the separated particles being recycled will have sufficient forward motion.

As a particle return means there are in general two types available, pneumatic and mechanical. The system described above employs a high pressure gas jet and exemplifies a pneumatic return means. A mechanical return means is exemplified by an auger arrangement.

The particle stream leaving the exit port 51 passes upwardly by the gas foil guidance element 48. This guidance element serves to move the gas stream about itself within the venturi region 32 without disrupting gas flow and creating objectionable disturbances, especially in the throat region 37 of the venturi 32. The recirculated particles leaving the throat region 37 of the venturi 32 join and mix with the discrete solids circulating within the coating chamber 74 within coating zone 13 beginning with that region immediately before the base of control cone 75.

The time necessary for the particles being recirculated to pass out the top 70 of the coating chamber 74 and through the particle separation means and particle return means and out past the gas foil guidance element, which time is herein briefly referred to as the recycle time, should not be appreciably greater than that time required for the discrete particles circulating within the coating chamber 74 to pass downwardly along the interior walls of coating chamber 74 and through the throat region 28 to reenter the mouth of the control cone 75, herein briefly referred to as the chamber circulation time. Otherwise, the obvious result is that the recirculated solids acquire less coating than the chamber-circulated particles.

In general, the velocity of the recycled solids at exit port 51 for feed-through duct 50 should be greater than zero. Even though this velocity can be very small, it is made necessary by the fact that if the velocity at the point of return to the gas stream below the gas foil guidance element 48 was zero, there is a possibility that the recycle time would be lengthened unduly since the gas stream and duct 24 would, in effect, have to pull particles from port 51 as by aspiration.

While the gas foil guidance element 48 is depicted in FIGS. 1 through 5 as involving the use of opposed cones or conical sections, such need not be the case for, as anyone familiar with aerodynamic principles will appreciate, any guidance element which although obstructing the gas flow, serves to avoid unnecessary turbulence while increasing the gas flow velocity is the proper gas foil for use within the spirit and scope of this invention.

Figures 2, 3:
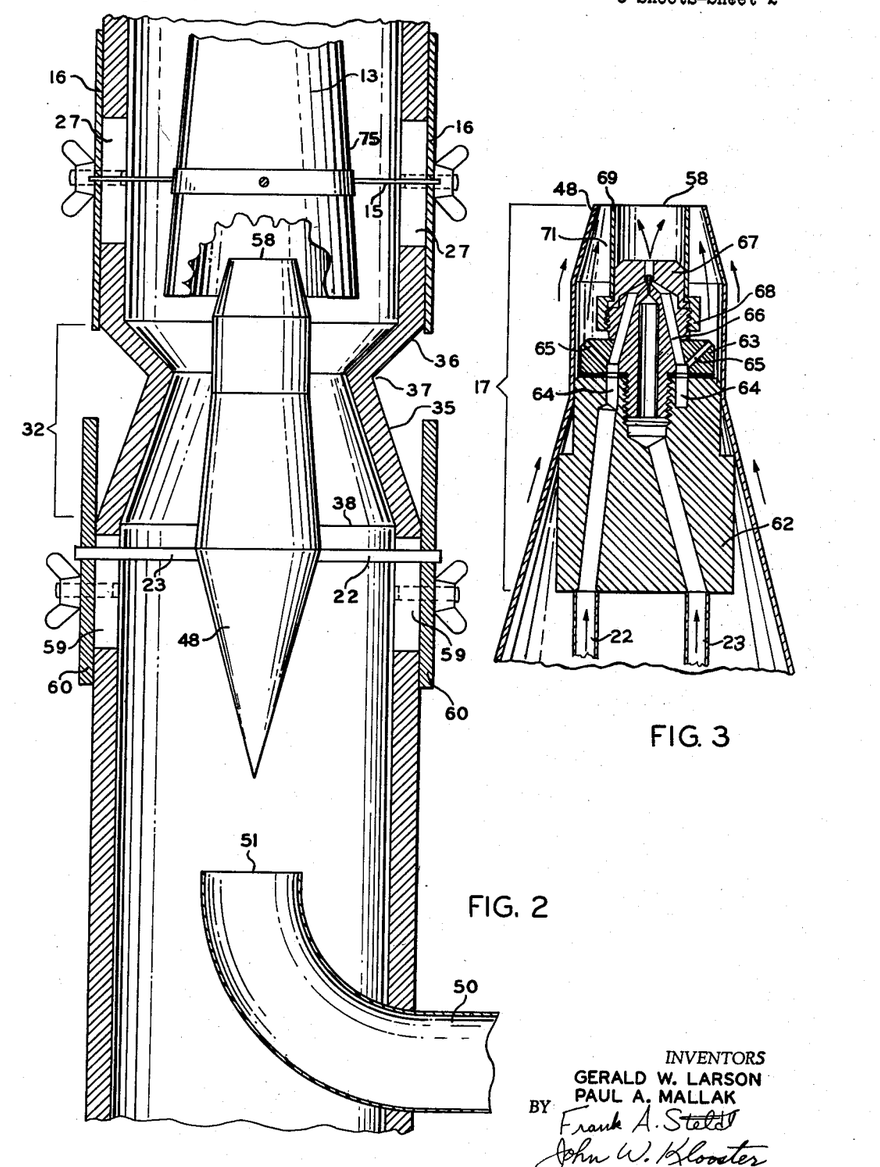
FIGURE 2 is a cut-away view of an embodiment of coating apparatus of this invention in the region of the venturi and control element showing a relationship between control element, gas foil guidance element, venturi, and recirculation feed-through pipe.
FIGURE 3 is a vertical section through the middle of the upper region of the gas foil guidance element shown in FIG. 2 showing one type of atomization assembly for use with the apparatus of this invention.

The arrangement shown in FIG. 2 is particularly well suited for use where one is coating porous or light weight particles which would tend to aggregate on collision with one another within the control element when such particles are wetted with atomized coating material. This arrangement insures that the particles will have maximum vertical velocity at the time of contact between particles and atomized coating material.

Similarly, the atomizer assembly fitted into exit port 58 for the atomized coating material need have no particular construction. However, one useful type of atomizer assembly is shown in FIG. 3. Here through intake 23 is introduced the liquid material to be used for coating. Through intake 22 is fed the gas for atomization.

Intake 22 leads to an atomizing gas reservoir 64 which serves as an equalizer chamber for gas pressure. This equalizer chamber is formed from two parts of the atomizer, to wit, the atomization nozzle body 62 and a hexagonally-shaped fluid nozzle 63. Fluid nozzle 63 is equipped with twelve exit ducts, six of which ducts (indicated by reference numeral 65 in FIG. 3) lead to an equalizer reservoir 71 while the other six (indicated by reference numeral 66 in FIG. 3) lead to air nozzle 67.

Air nozzle 67 fits over fluid nozzle 63 and atomization nozzle body 62. Threaded retaining ring 68 secures air nozzle 67 to fluid nozzle 63. Slipped over the outside of air nozzle 67 is an inner nozzle protector sleeve 69. An outer nozzle protector sleeve is formed by the uppermost edges of the gas foil guidance element 48 itself. Equalizer reservoir 71 is thus provided which insures that a continuous gas wall will initially circumscribe the atomized coating material as it issues forth from exit port 58.

Figures 4, 5:
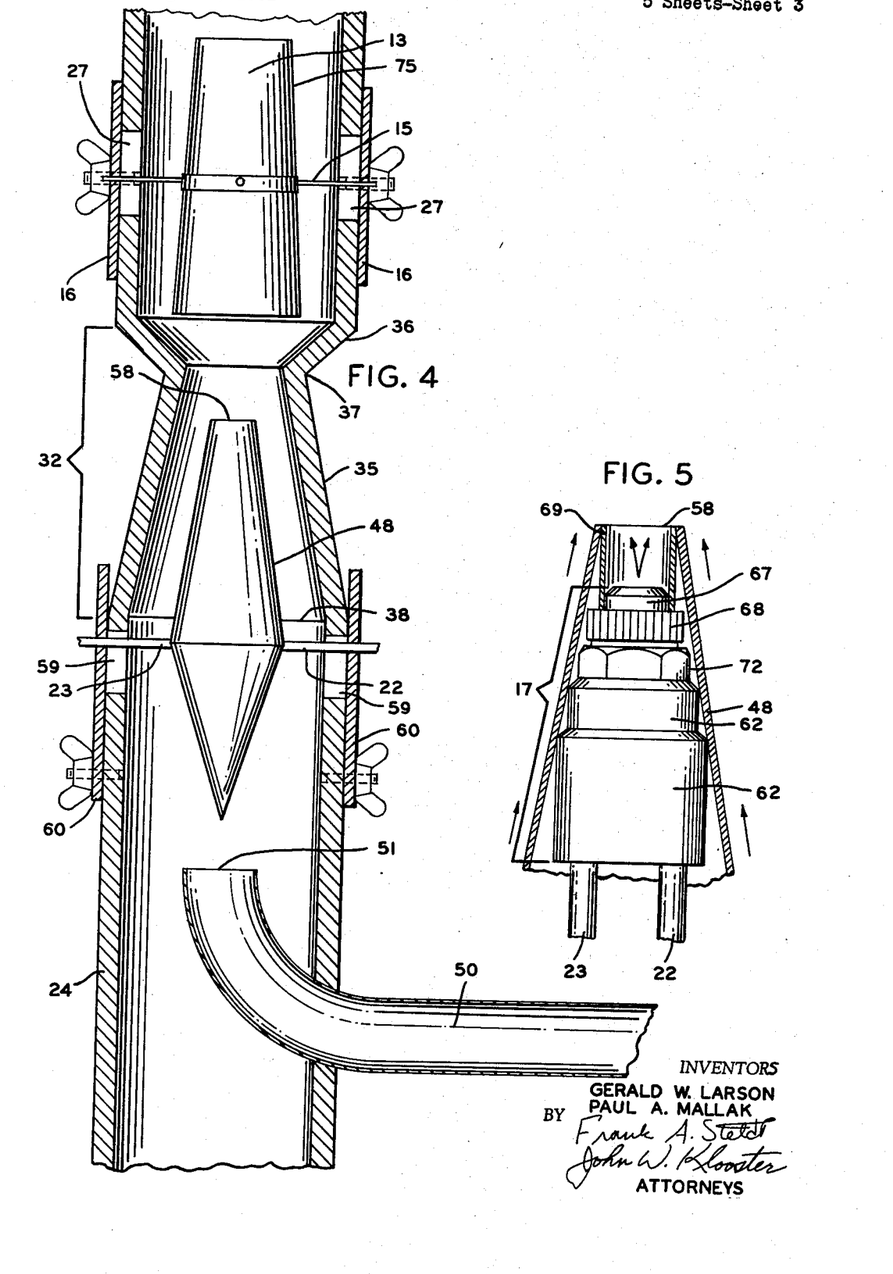
FIGURE 4 is a cut-away view of an embodiment of coating apparatus of this invention in the region of the venturi and a control element showing a relationship between control element, gas foil guidance element, venturi, and recirculation feed-through pipe.
FIGURE 5 is a partial vertical section through the middle of the upper region of the gas foil guidance element shown in FIG. 4 showing a second type of atomization assembly for use with the apparatus of this invention.

FIGURE 4 illustrates a second possible arrangement for the venturi region of the apparatus of this invention. Note the difference in design and positioning of the gas foil guidance element 48.

Atomizing nozzle 17 positioned in the venturi throat 37 may be adjusted vertically to vary the distance the spray droplets must travel before striking the suspended solid particles. Any conventional adjustment means can be used for this purpose.

Similarly, control cone 75 can also be adjusted vertically along its central axis so as to regulate the distance between the base of cone 75 and the exit cone wall 36 of the venturi. As mentioned above, the venturi-type restriction provides a high velocity, flat profile jet of air with a minimum pressure drop that supports the particles above the throat and away from the nozzle. Among other things, this action prevents fouling of the nozzle by the solid particles without interfering with, or impeding the flight of, the spray droplets. The prevention of such fouling has heretofore been a very severe problem in this art of particle coating.

The velocity concentration control element (cone or cylinder) serves to concentrate the solid particles and provides a desirable sharp discontinuity in the velocity profile of the particles in the coating chamber. This discontinuity is highly advantageous in preventing "choking" or "slugging" of particles within the coating chamber by providing an annular path for the particles returning to the coating zone from the disengaging zone. Heretofore, choking or slugging has been a severe problem in the art of coating solid particles.

The term "slugging" is a term applied to the well known phenomenon whereby there occurs a bunching of particles within a stream of vertically flowing air. It is produced when the velocity of the upper flowing air stream is not great enough to support a significant fraction of the particles at a given point in the column of flowing air as compared with a starting point lower down in the same column. At this point the particles decelerate and in some cases actually begin to fall. Upward moving particles from below, however, catch up and as a result the particles as a whole tend to bunch so that a still further impediment to the air flow results. Gas flow within a coating apparatus can be thereby completely disrupted thoroughly killing a conventional coating operation.

In the present invention, slugging is substantially completely avoided by the use of a control element. The pitch or slope of the walls of the control element is such as to maintain the gas velocity at any given point in the element at a level which is greater than that necessary to move any given average type of particle being coated in a continuous upward direction.

In FIGURE 5 is shown a second nozzle assembly for use within the nose region of the gas foil guidance element 48. Here, as above, the material to be coated is fed through intake duct 23 and the air or gas for atomization is fed through duct 22. The atomization nozzle assembly comprises an atomization nozzle body 62, a hexagonally shaped fluid nozzle 72 having six exit ducts, a threaded retaining ring for a nair nozzle 67 and, about the top of the latter, an inner nozzle protector sleeve 69. Here the six exit ducts from fluid nozzle 72 simply feed directly into the vicinity of the retaining ring 68 about the point where the fluid 23 issues for atomization within air nozzle 67. The arrows in FIGS. 3 and 5 indicate generally the respective directions of flow.

As the solid particles circulate within the apparatus, that is, both the recycled solids and the chamber circulated solids, they build up a uniform coating conforming to any surface irregularities of the individual particles. This coating, though depending somewhat upon the particular type of coating being applied, is generally substantially free from pin holes and other surface flaws. Within the disengaging zone 14 the coating drys upon the surface of the individual particles so as to avoid any agglomeration of particles. Should, however, some agglomeration occur, the eventual net effect is that a (heavy) agglomerated particle is not supported by the gas stream and it simply falls downward past the gas foil guidance element and into the bottom of duct 24. From thence such particles can be collected by opening gate valve 19 and permitting the particles to fall down into collector bin 25 from whence they can be removed from gate valve 26, all being accomplished without interrupting the coating operation itself. Of course, once the unagglomerated particles have acquired the desired coating, a convenient method of extracting the coated particles from the apparatus is to simply turn off the blower and allow the particles to fall into the collector bin 25.

Figures 6, 7:
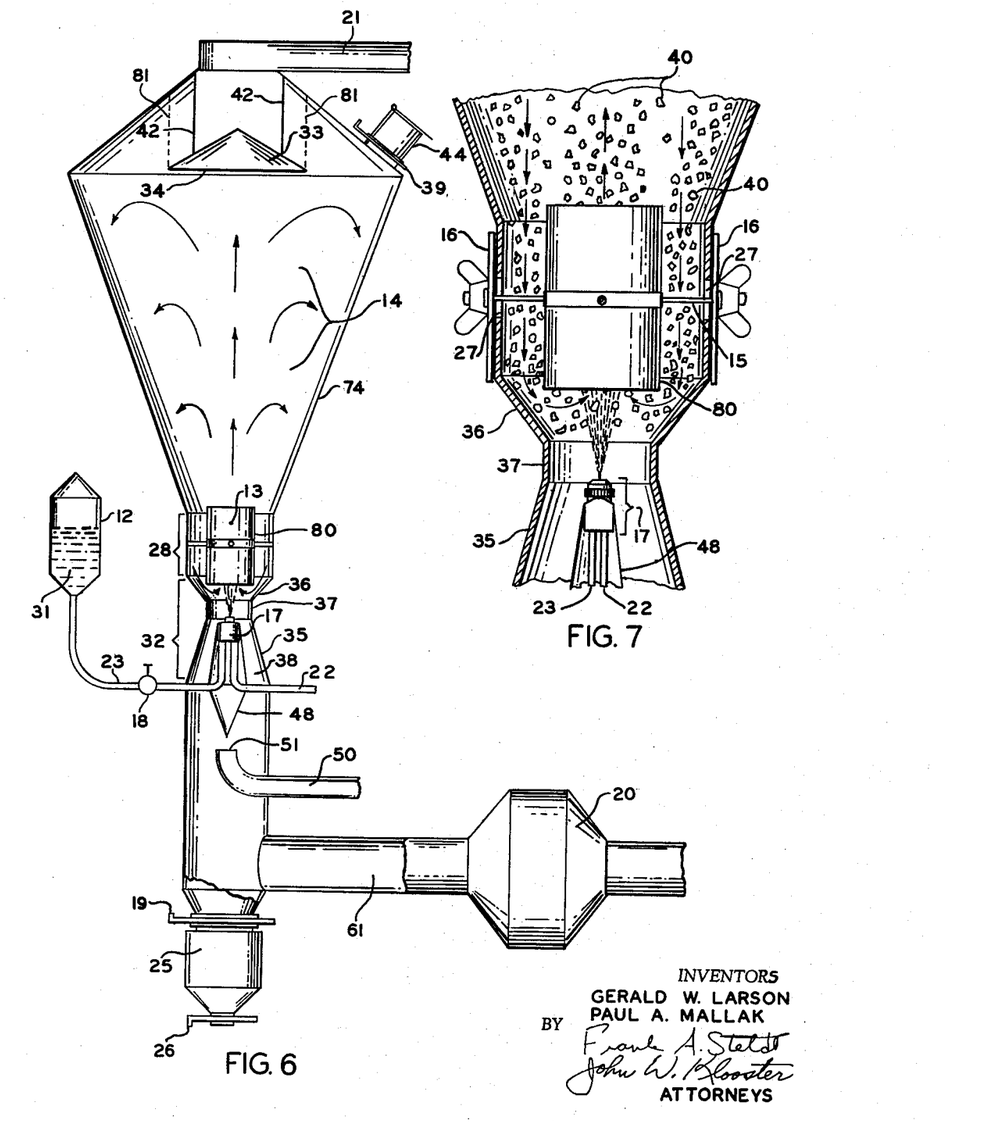
FIGURE 6 is a diagrammatic representation of an embodiment of apparatus constructed in accordance with this invention.
FIGURE 7 is a cut-away view of the coating apparatus of FIG. 6 in the region of venturi and control element showing one relationship between control element, venturi, and gas foil guidance element.

In FIGURE 6 is shown a modification of the apparatus shown in FIG. 1. In the upper portion of the coating chamber 74 is positioned a conical baffle arrangement 33 which is suspended from support rods or struts 42. The open mouth of baffle 33 is closed by a guide plate 34. The purpose of this baffle 33 and guide plate 34 is to aid in directing the flow of solid particles within the coating chamber 74. Here the control element is a cylinder 80 which is axially positioned by vertically translatable means within the funnel-shaped neck or base region of coating chamber 74.

In FIGURE 7 is shown a view through the venturi and base region of the apparatus as shown in FIG. 6. The particle 40 flow pattern is indicated by the arrows.

Figures 8, 9, 10:
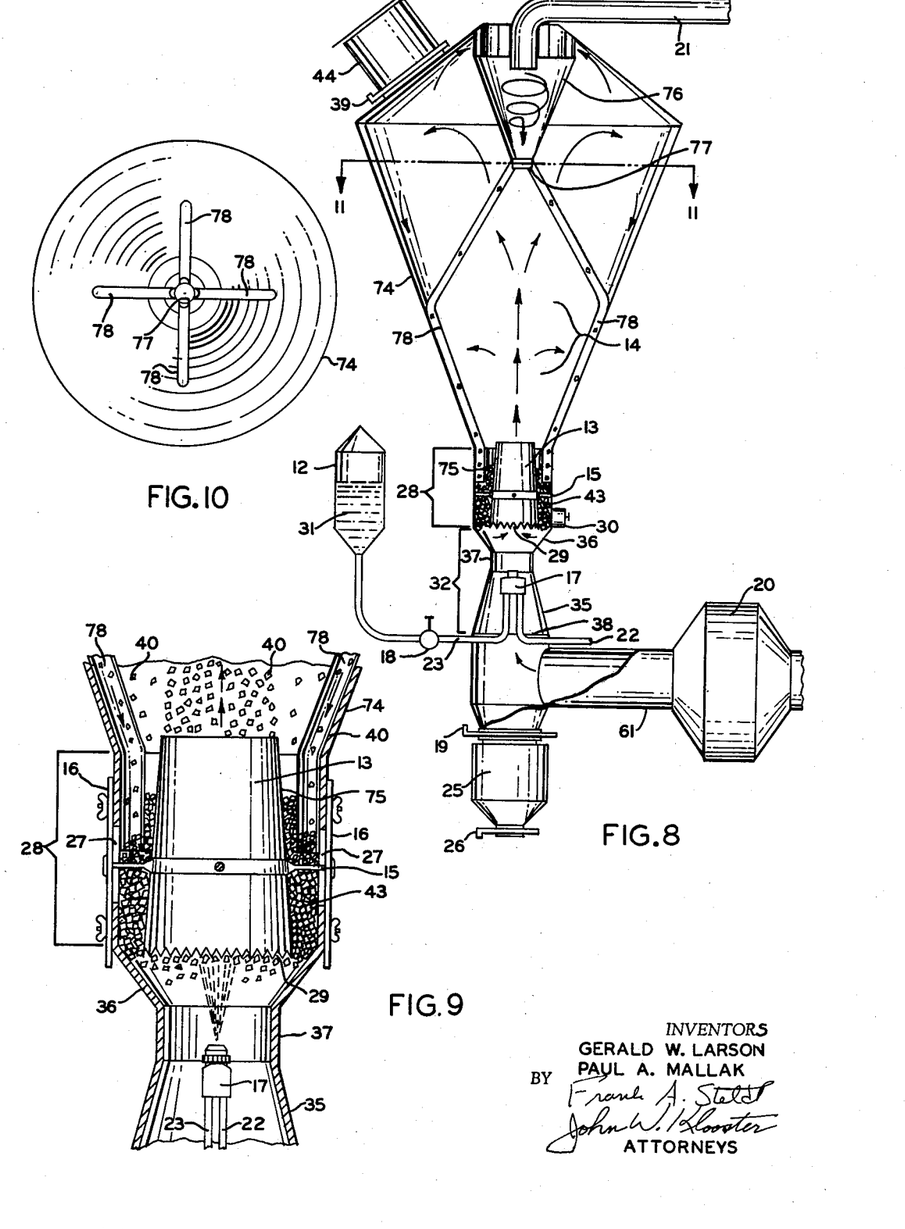
FIGURE 8 is a diagrammatic representation of still another embodiment of apparatus constructed in accordance with this invention employing an annular discrete solid bed circumscribing the control element wherein recycling is internally accomplished.
FIGURE 9 is a cut-away view of the coating apparatus of FIG. 8 in the region of venturi and control element showing one relationship between control element, venturi and gas foil guidance element.
FIGURE 10 is a cross-section through the coating apparatus of FIG. 8 taken along the line 11—11 showing arrangement of the dip legs extending from the internal cyclone separator.

In FIGURE 8 is shown an interior recycle arrangement whereby a cyclone arrangement 76 is used to separate interiorly particles carried off with the exhaust gas stream. The particles enter the vents in the upper portion of cyclone 76 and exit through the base region 77, then through dip legs 78 the particles, by gravity, are fed down to bed 43 which is allowed to build up along the interior walls near the base of coating chamber 74 in the space between these walls and the control cone 75. A vibrator 30 is fitted to the side of the coating chamber 74 to aid in causing the particles in the bed 43 to move downwards to the point where they will reenter the entering gas stream leaving the venturi 32 and enter the interior of the control cone 75, there to be recycled and recirculated. Observe that the bottom of the control cone is serrated so as to promote the downward movement of particles in the bed 43. By shifting the position of the control cone upon its vertical axis, the distance between the base of the cone 75 and the exit cone 36 of the venturi can be so regulated as to control the quantity of material recirculated. The serrations are more particularly disclosed in FIG. 10.

In FIG. 10 is shown a cross-section through the upper middle portion of the control chamber 74 along the line 11—11. This figure discloses the position of the dip legs 78 for the interior recycle arrangement.

In a preferred embodiment of this invention there are employed pressures less than those of the environment surrounding the entire coating apparatus. This has a number of advantages, among which are the elimination of the need for a pressure-tight apparatus, the avoidance of fine powders or noxious materials from the apparatus and, because of the low pressure, the use of lower temperatures for handling heat-sensitive materials. The loading of solids to be coated into coating chamber 74 is greatly facilitated and rapid homogeneous distribution of atomized coating material throughout the entire coating zone is promoted.

The claims are:
1. An apparatus for coating discrete solids comprising: (a) a vertically positioned coating chamber characterized by having a vertically translatable tubular control element axially positioned within a funnel-shaped base region, said control element being circular in cross-section on all planes perpendicular to the axis, (b) a venturi tube connected to the base of said coating chamber, said venturi tube having an atomizer assembly axially positioned and vertically translatable within it, the throat region of said venturi having a diameter less than the greatest diameter of said control element, said atomizer assembly being adapted to atomize a liquified coating material upwards into the interior of said control element and being enclosed within a gas foil guidance element which is adapted to guide a gas stream upwards along its outer surfaces through said venturi tube into the control element interior, (c) a means for supplying a gas stream to pass first through said venturi tube, then said coating chamber, and finally to exhaust out through the top central region of said coating chamber, said gas stream having sufficient velocity after leaving said venturi tube to support and circulate discrete solids within said coating chamber, and (d) a recycle means adapted to separate discrete solids taken off with the exhaust gas stream from the top of said funnel-shaped chamber and then to feed back such separated solids to the coating chamber all within a total time interval such that there results no substantial difference in final coating thickness between recycled solids and coating chamber circulated solids.

2. An apparatus for coating discrete solids comprising: (a) a vertically positioned coating chamber characterized by having a vertically translatable tubular control element axially positioned within a funnel-shaped base region, said control element being circular in cross-section on all planes perpendicular to the axis, (b) a venturi tube connected to the base of said coating chamber, said venturi tube having an atomizer assembly axially positioned and vertically translatable within it, the throat region of said venturi having a diameter less than the greatest diameter of said control element, said atomizer assembly being adapted to atomize a liquified coating material upwards into the interior of said control element, (c) a means for supplying a gas stream to pass first through said venturi tube, then said coating chamber, and finally to exhaust out through the top central region of said coating chamber, said gas stream having sufficient velocity after leaving said venturi tube to support and circulate discrete solids within said coating chamber, and (d) an internal recycle means adapted to separate discrete solids taken off with the exhaust gas stream from the top of said funnel-shaped chamber and then to feed back such separated solids to the coating zone within said coating chamber all within a total time interval such that there results no substantial difference in final coating thickness between recycled solids and coating chamber circulated solids.

3. In an apparatus for coating discrete solids comprising a vertically positioned coating chamber having a tubular control element mounted within a funnel-shaped base region and having a venturi tube connected to such base, such venturi having an axially positioned vertically translatable atomizer assembly within it, the improvement which comprises inserting a gas foil guidance element about the atomizer assembly in the throat region of the venturi, said gas foil guidance element being centrally positioned along the axis of the venturi and being adapted to guide a gas stream upwards along its outer surfaces into the control element interior.

4. In an apparatus for coating discrete solids comprising a vertically positioned coating chamber having a vertically translatable tubular control element positioned within a funnel-shaped base region and having a venturi tube connected to such base, the improvements which comprise inserting a gas foil guidance element about an atomizer assembly axially positioned and vertically translatable within the venturi so as to guide a gas stream upwards along its outer surfaces into the control element interior and means for conveying discrete solids exhausted through the uppermost regions of said funnel-shaped coating chamber to the region immediately below said gas foil guidance element for recycling.

5. An apparatus for coating discrete solids comprising a vertically positioned coating chamber having a tubular control element axially mounted within a funnel-shaped base region and having a venturi tube connected to such base, said venturi tube having an axially positioned and vertically translatable gas foil guidance element within it, said guidance element being adapted to guide upwards into the control element interior an air stream passing upwards through the said venturi tube, said gas foil guidance element having an atomizer assembly mounted within it so as to pass atomized coating material upwards into the coating chamber, said coating chamber being equipped with means to recycle discrete solids exhausted through the top of said funnel-shaped coating chamber to the region immediately below said gas foil guidance element.

6. An apparatus for coating discrete solids containing a vertically positioned coating chamber, and having a venturi tube connected to a funnel-shaped base of such coating chamber, such coating chamber having a control element mounted within its base region, such control element being characterized by having circular cross-sections on all planes perpendicular to the axis, the diameter of the largest cross-section being greater than the throat of said venturi, such venturi being further characterized by having an axially positioned and vertically translatable atomizer assembly generally in the region of its throat.

7. An apparatus for coating discrete solids containing a vertically positioned coating chamber, and having a venturi tube connected to a funnel-shaped base of such coating chamber, such coating chamber having a control element mounted within its base region, such control element having a base diameter both greater than its top diameter and greater than the throat of said venturi, such venturi being further characterized by having an axially positioned and vertically translatable atomizer assembly generally in the region of its throat.

8. The apparatus of claim 7 wherein a gas foil guidance element is circumferentially mounted about said atomizer assembly.

References Cited in the file of this patent
UNITED STATES PATENTS

| | | |
|---|---|---|
| 1,725,608 | Zebulske | Aug. 20, 1929 |
| 2,568,499 | Hood | Sept. 18, 1951 |
| 2,768,095 | Tadema et al. | Oct. 23, 1956 |